T. W. FAULDS.
COUPLING HOOK.
APPLICATION FILED JULY 30, 1919.
1,331,425. Patented Feb. 17, 1920.
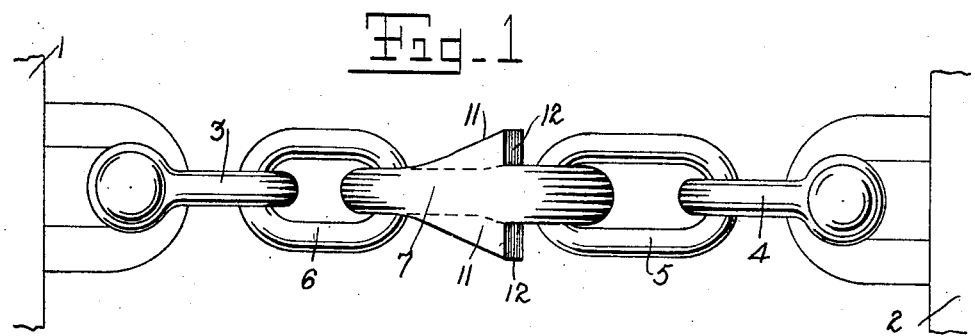
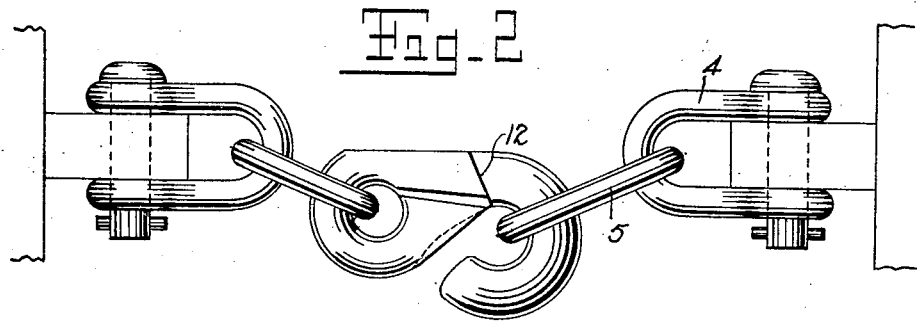
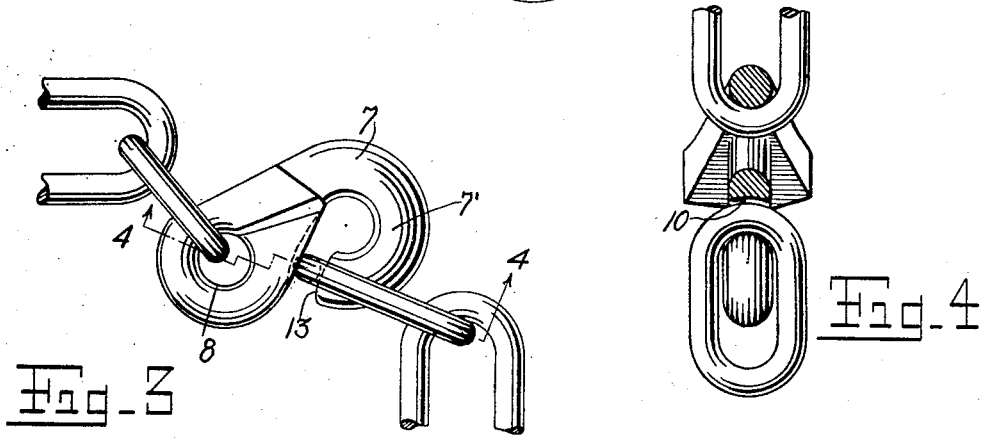
WITNESSES
Paul H. Berggren
S. W. Foster
INVENTOR
T. W. FAULDS
BY Munn & Co
ATTORNEYS

UNITED STATES PATENT OFFICE.

THOMAS W. FAULDS, OF CLINTON, INDIANA.

COUPLING-HOOK.

1,331,425.   Specification of Letters Patent.   Patented Feb. 17, 1920.

Application filed July 30, 1919. Serial No. 314,187.

*To all whom it may concern:*

Be it known that I, THOMAS W. FAULDS, a citizen of the United States, and a resident of Clinton, in the county of Vermilion and State of Indiana, have invented a new and Improved Coupling-Hook, of which the following is a full, clear, and exact description.

This invention relates to improvements in coupling hooks, an object of the invention being to provide a coupling hook, such as used for coupling cars and the like, in which the hook is held by gravity in its holding position and is so constructed as to prevent disengagement by any ordinary movement to which the parts would be subjected in operation.

A further object is to provide a coupling hook with relatively heavy shoulders on both sides operating as weights to assist the hook in maintaining its normal position, and also has shoulders to engage a link and prevent disconnection of the hook from the link when there is a contraction of the space between the cars.

A further object is to provide a coupling hook which can be released from the link only when the hook is moved to an abnormal position, such as it will not assume during any movement in its normal operation.

With these and other objects in view the invention consists in certain novel features of construction, and combinations and arrangements of parts, as will be more fully hereinafter described and pointed out in the claims.

In the accompanying drawings—

Figure 1 is a top plan view;

Fig. 2 is a view in side elevation;

Fig. 3 is a view in side elevation showing the position of the hook for disengagement from its link; and Fig. 4 is a view in section on the staggered line 4—4 of Fig. 3.

1 and 2 represent cars or more particularly the sills thereof having the ordinary clevises 3 and 4 respectively. A coupling link 5 engages the clevis 4 and a hook supporting link 6 engages the clevis 3 and is positioned in the eye 8 of my improved coupling hook 7. The hooked end 7' of hook 7 extends downwardly and rearwardly and is spaced from the body portion of the hook a distance slightly less than the diameter of the metal forming the coupling link 5 so that the coupling link cannot fall out of the hook under ordinary conditions.

The extreme end 13 of the hook is rounded, as shown most clearly in Fig. 4, and the body portion of the hook is recessed or concaved, as shown at 10, so that when the link is in the position illustrated in Figs. 3 and 4, the end 13 and the recess 10 will accommodate the rounded portions of the link to permit the hook to be disengaged therefrom, but in any other position the hook cannot be freed from the link. This position of release is an abnormal position which is not assumed during any ordinary operation as it requires the free end of the hook to be elevated and this does not happen in operation.

The hook 7 is provided on both sides with enlargements 11 which have flat shoulders 12 at their ends. These enlargements 11 operate as weights to hold the hook in its normal position, and also the shoulders 12 operate to engage the coupling link when the hook is moved forwardly relative to the link. In other words, to continue the movement of the link shown in Fig. 2 to the right in said figure, while the clevis 4 remains stationary, would cause the shoulders 12 to engage the coupling link 5 and prevent any possibility of disconnection of the hook from the link.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A coupling hook of the character stated, comprising a body having an eye therein, and a hook-shaped end spaced from the body, the face of said end and the said body curved concentrically, whereby a coupling link can be moved into and out of the hook when in a certain relative position and held in the hook when in any other position.

2. A coupling hook of the character stated, comprising a body having an eye therein, and a hook-shaped end spaced from the body, the face of said end and the said body curved concentrically, whereby a coupling link can be moved into and out of the hook when in a certain relative position and held in the hook when in any other position, said hook having laterally projecting shoulders on its body portion adjacent its hooked end adapted to engage a coupling link when moved in one direction relative to the link.

3. The combination with a coupling link, of a coupling hook comprising a body portion having an eye therein, a link in the eye supporting the coupling hook, said coupling hook having a downwardly and rearwardly projecting hooked end, the face of the body and said end curved concentrically, and laterally projecting enlargements on the body portion of the hook forming relatively flat shoulders to engage the coupling link when the hook is moved relative to the link.

4. The combination with a coupling link, of a coupling hook, comprising a body portion having an eye therein, a link in the eye supporting the coupling hook, said coupling hook having a downwardly and rearwardly projecting hooked end, and laterally projecting enlargements on the body portion of the hook forming relatively flat shoulders to engage the coupling link when the hook is moved relative to the link, said hook at its extreme end spaced from the body portion a distance less than the thickness of the link, said body portion having a recess therein, and said end shaped concentrically with the wall of the recess, whereby the hook may be disengaged from the link when the latter is in an abnormal position.

THOMAS W. FAULDS.